(12) United States Patent
Falossi

(10) Patent No.: US 10,866,257 B2
(45) Date of Patent: Dec. 15, 2020

(54) WHEEL HUB BEARING PROVIDED WITH A DEVICE FOR MEASURING THE ROTATIONAL SPEED

(71) Applicant: Aktiebolaget SKF, Gothenburg (SE)

(72) Inventor: Marco Falossi, San Raffaeke Cimena (IT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/115,681

(22) Filed: Aug. 29, 2018

(65) Prior Publication Data

US 2019/0154721 A1 May 23, 2019

(30) Foreign Application Priority Data

Nov. 21, 2017 (IT) .......................... 102017000132614

(51) Int. Cl.
| | |
|---|---|
| *F16C 41/00* | (2006.01) |
| *G01P 3/44* | (2006.01) |
| *B60B 27/00* | (2006.01) |
| *F16C 33/58* | (2006.01) |
| *G01P 3/486* | (2006.01) |
| *F16C 19/18* | (2006.01) |

(52) U.S. Cl.
CPC .......... *G01P 3/443* (2013.01); *B60B 27/0005* (2013.01); *B60B 27/0068* (2013.01); *F16C 33/585* (2013.01); *F16C 33/586* (2013.01); *F16C 41/007* (2013.01); *G01P 3/486* (2013.01); *F16C 19/186* (2013.01); *F16C 2233/00* (2013.01); *F16C 2326/02* (2013.01)

(58) Field of Classification Search
CPC .... G01P 3/443; F16C 41/007; F16C 2326/02; F16C 33/585; F16C 33/586; F16C 19/186; F16C 2233/00; B60B 27/0005; B60B 27/0068
See application file for complete search history.

(56) References Cited

U.S. PATENT DOCUMENTS 5,127,747 A * 7/1992 Hilby ...................... G01P 3/443
310/168
5,184,069 A * 2/1993 Adler ...................... G01P 3/443
324/174
(Continued)

FOREIGN PATENT DOCUMENTS

DE 6981638 T2 4/2004
DE 69816385 T2 4/2004
(Continued)

OTHER PUBLICATIONS

Machine translation of JP-2003074575-A (Year: 2003).*

*Primary Examiner* — Alan B Waits
(74) *Attorney, Agent, or Firm* — J-Tek Law PLLC; Scott T. Wakeman; Mark A. Ussai

(57) ABSTRACT

A hub bearing for motor vehicles includes a rotatable hub and a bearing unit. The bearing unit has a radially outer ring, provided with respective radially outer raceways, a radially inner ring, provided with respective radially inner raceways, and a plurality of rolling bodies positioned between the corresponding inner and outer raceways. The hub bearing has an optical reading device for measuring the rotational speed of one of the hub or the radially inner ring. The optical reading device is mounted on the radially outer ring.

13 Claims, 5 Drawing Sheets

(56) References Cited

U.S. PATENT DOCUMENTS

| | | | |
|---|---|---|---|
| 5,436,292 A | 7/1995 | Jenkins et al. | |
| 5,642,042 A * | 6/1997 | Goossens | G01P 1/00 324/173 |
| 5,859,426 A | 1/1999 | Audagnotto et al. | |
| 6,841,993 B2 * | 1/2005 | Iwamoto | G01P 3/443 324/207.21 |
| 7,874,732 B2 | 1/2011 | Ozaki et al. | |
| 8,436,292 B2 | 5/2013 | Takahashi et al. | |
| 2002/0157470 A1 * | 10/2002 | Noetzel | F16C 19/522 73/593 |
| 2005/0201648 A1 * | 9/2005 | Takada | F16C 41/007 384/448 |
| 2009/0038414 A1 * | 2/2009 | Ozaki | B60B 27/0005 73/862.381 |
| 2012/0204638 A1 * | 8/2012 | Kakuda | F16C 33/78 73/494 |
| 2012/0243818 A1 | 9/2012 | Takimoto et al. | |

FOREIGN PATENT DOCUMENTS

| | | | |
|---|---|---|---|
| EP | 0902257 B1 | 7/2003 | |
| EP | 1748203 A1 | 1/2007 | |
| JP | 2003074575 A * | 3/2003 | ............ F16C 41/007 |

\* cited by examiner

WHEEL HUB BEARING PROVIDED WITH A DEVICE FOR MEASURING THE ROTATIONAL SPEED

CROSS-REFERENCE

This application claims priority to Italian patent application no. 102017000132614 filed on Nov. 21, 2017, the contents of which are fully incorporated herein by reference.

FIELD OF THE INVENTION

The present invention relates to a wheel hub bearing which is provided with a device for measuring the rotational speed, that is to say a sensor that measures the rotational speed of a wheel of a motor vehicle, and is controlled by a known Antilock Brake System (ABS).

The present invention is particularly, although not exclusively, suitable for wheel hub bearings of motor vehicles. These bearings are provided with rolling bearings. These applications include both, a case in which the outer ring of the bearing is rotatable while the inner ring of the bearing is fixed and an opposite case, in which the inner ring rotates and the outer ring is fixed. The invention is also suitable for any type of rolling bodies (balls, rollers, tapered rollers, and the like).

BACKGROUND

Devices for measuring the rotational speed of the rotating ring of a bearing are known and in common use. Such devices comprise a phonic wheel or encoder and a sensor, usually a revolution sensor, capable of acquiring a signal generated by the phonic wheel. The device is controlled by the braking control system (ABS) and may also be used to monitor the kinematic operating parameters of the wheel hub bearing containing a rolling bearing.

The phonic wheel or encoder takes the form of an annular disc or cylindrical shield made of magnetized plastic or rubber. It is angularly fixed to the rotating ring of the bearing. In known solutions, the encoder comprises a metal insert fixed to the magnetized plastic or rubber portion, by an adhesive for example, and fixed by force-fitting to the rotating ring of the bearing or to an element fixed thereto.

Known phonic wheel solutions are therefore produced using magnetized rubber or plasto-ferrite, which are respectively co-vulcanized with or co-molded on to a metal insert with a thickness of about 0.6-0.8 mm, having a structural function.

The measurement of the rotational speed of each respective wheel or of the bearing associated with the respective wheel is essential to the ABS functionality. As mentioned, the sensors that are normally used are based on magnetic effects, are positioned outside the bearings, usually in openings formed in the suspension, and face the bearings. The encoder generating the magnetic signal is located on the bearing and is mechanically connected to the rotating ring. The distance between the encoder and the sensor is essential to ensuring that the signal will be read even in the worst conditions. This is a major constraint on the design of the wheel hub bearing and requires tighter tolerances for the suspension.

The existing technology is also limited by the density of the opposite polarity pairs that can be accommodated on the encoders. This density of pole pairs thus limits the resolution of the reading by the sensor. This limit is becoming increasingly burdensome, since the use and distribution of autonomous driving devices for vehicles is generating a demand for greater resolution to improve the monitoring of a vehicle's position.

In designing wheel hub bearings, use is also made of "sensor carrier" devices which house the sensor on the bearing itself, rather than on the suspension, but this solution does not lead to an improvement of the resolution of the reading by the sensor.

Consequently there is a need to design a rotational speed measuring device that is free of the aforementioned drawbacks and that, in particular, can provide an optimal reading resolution, suitable for the requirements of motor manufacturers.

BRIEF SUMMARY OF THE PRESENT INVENTION

An object of the present invention is to provide a wheel hub bearing provided with a device for measuring the rotational speed. Instead of comprising a known magnetic effect sensor (that is to say, an encoder and the revolution sensor itself), the device is based on optical reading, particularly using a laser beam, in a similar way to the devices used for the known computer mouse. Both the element emitting the light beam and the element receiving the same light beam are preferably housed inside the rolling bearing, and particularly on the axially inner edge of the outer ring of the bearing. The light beam is reflected by the inner ring of the bearing which, depending on the application, may be integrated into the tubular body of the hub or may be an element separate from the hub and mounted thereon.

By using such a device it is possible to improve considerably the resolution of the measurement of the rotational speed, compared with the resolution provided by magnetic effect sensors commonly used for wheel hub bearings.

According to the present invention, therefore, a description is given of a wheel hub bearing provided with a device for measuring the rotational speed by optical reading, the wheel hub bearing having the characteristics as follows:
- a radially outer ring, stationary, provided with respective radially outer raceways;
- a radially inner ring, rotatable, provided with respective radially inner raceways;
- a plurality of rolling bodies respectively accommodated between the inner and the outer raceways; and
- an optical reading device for detecting the rotational speed of one of the rotatable hub or the radially inner ring,
- wherein the optical reading device is mounted on the radially outer ring.

In another aspect, the optical reading device further comprises:
- a transmitter element configured to emit a light beam;
- a receiving element configured to receive a light beam reflected from the radially inner ring;
- an electronic component for the management and support of the transmitter element and the receiving element, the electronic component being housed on the radially outer ring; and
- a data cable for transmitting optical readings to a controller, the data cable being electrically connected to the electronic component.

In yet another aspect, the electronic component is mounted on an axially inner edge of the radially outer ring.

In yet another aspect, an end portion of the data cable is electrically connected to the electronic component, and the data cable is housed in a groove formed in the axially inner edge of the radially outer ring.

In yet another aspect, the electronic component is housed in a first groove formed in the axially inner edge of the radially outer ring.

In yet another aspect, an end portion of the data cable is electrically connected to the electronic component, and the data cable is housed in a second groove formed in the axially inner edge of the radially outer ring.

In yet another aspect, the optical reading device is mounted on a radially outer flange of the radially outer ring, and an axially outer flange of the hub is configured to reflect the light beam.

BRIEF DESCRIPTION OF THE DRAWINGS

The invention will now be described with reference to the attached drawings, which show some non-limiting examples of embodiment, in which.

DETAILED DESCRIPTION OF THE PRESENT INVENTION

Figure 1A:
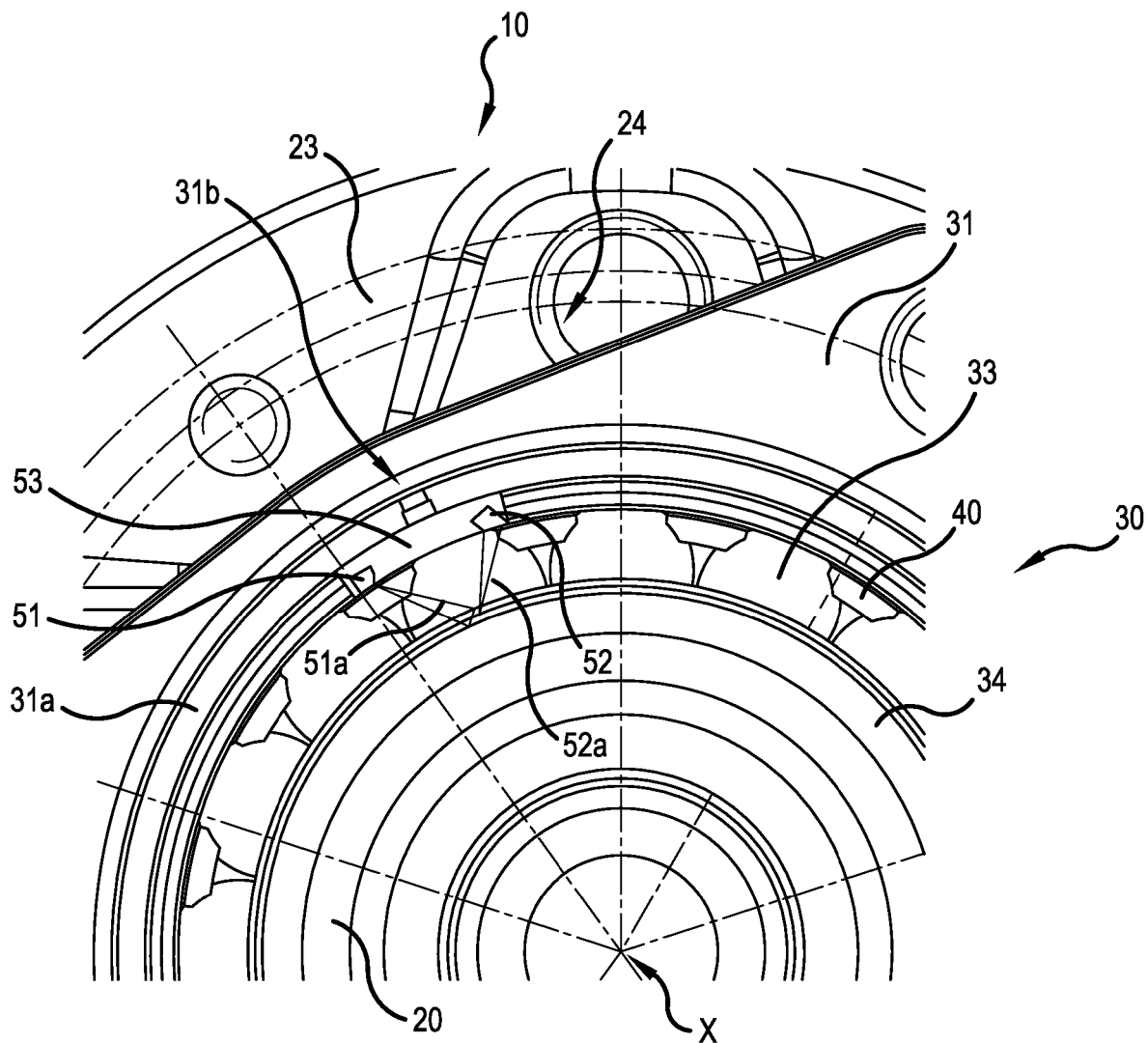
FIG. 1A presents a front view of a wheel hub bearing provided with a rotational speed measuring device using optical reading, in accordance with a first embodiment of the invention.

With reference to the aforementioned figures, a wheel hub bearing according to a preferred embodiment of the invention is indicated as a whole by 10. As stated in the introduction, the invention is applicable not only to the configuration described below but more generally to any wheel hub bearing for motor vehicles.

The bearing 10 comprises a hub 20, which is preferably, but not necessarily, rotatable, and a bearing unit 30. The hub 20 is configured so that it also acts as an inner raceway ring of the bearing. Throughout the present description and in the claims, any terms and expressions indicating positions and orientations such as "radial" and "axial" are to be interpreted as relating to the central axis of rotation X of the bearing unit 30. Expression such as "axially outer" and "axially inner" relate to the mounted condition, and, in this particular case, preferably relate to one side of a wheel and to a side opposed to this side of the wheel, respectively.

The bearing unit 30 comprises a radially outer ring 31, preferably but not necessarily stationary, provided with respective radially outer raceways, at least one rotatable radially inner ring 20, 34, provided with respective radially inner raceways, and two rings of rolling bodies (only one of which, namely the axially inner ring of rolling bodies 33, is shown in the figures), the rolling bodies being balls in this case. The axially outer ring of rolling bodies is interposed between the radially outer ring 31 and the hub 20 which acts as the radially inner ring, while the axially inner ring of rolling bodies 33 is interposed between the radially outer ring 31 and the radially inner ring 34. To simplify the graphic representation, the reference 33 is given both to the individual balls and to the ring of balls, and, in particular, the reference 33 indicates the axially inner ring of balls or individual ball. Also for simplicity, the term "ball" may be used by way of example in the present description and in the attached drawings in place of the more generic term "rolling bodies" (and the same reference numerals are also used). It is to be understood in all cases that the balls may be replaced by any other rolling bodies (such as rollers, tapered rollers, needle rollers, or the like).

According to a preferred embodiment of the invention which is not shown, but may easily be deduced from the description provided here, the radially outer ring 31 could also be a rotatable ring, and the radially inner ring could also be a stationary ring.

The rolling bodies of the rings are held in position by corresponding cages. In particular, the figures show the axially inner cage 40 for the rolling bodies 33.

At its axially inner end, the hub 20 has a rounded edge 22 configured to pre-load the inner ring 34 axially. The hub 20 also has an axially outer flange portion 23. The flange portion has a plurality of axial fixing holes 24. These holes are the seats for the same number of fixing means (such as captive bolts, not shown in the figure), which connect, in a known way, an element of the wheel of the motor vehicle, for example the brake disc (also of a known type, and not shown in the figure), to the hub 20.

Figure 1B:
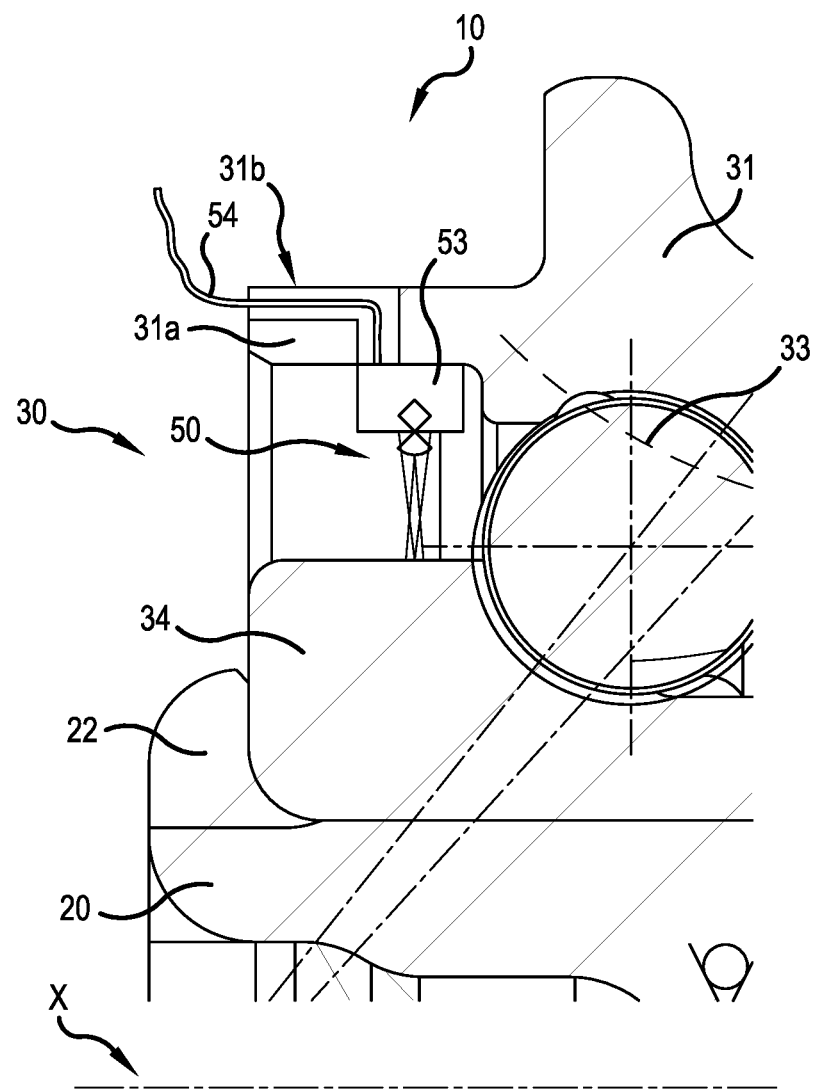
FIG. 1B presents a partial axisymmetric section view of the wheel hub bearing provided with the rotational speed measuring device using optical reading, as originally introduced in FIG. 1A.

The bearing has a device 50 for measuring the rotational speed of the rotatable ring of the bearing unit 30, for example the radially inner ring 34. Instead of comprising a known magnetic effect sensor, the device is based on optical reading, particularly using an optical or laser beam, in a similar way to the devices used for personal computer mice. According to a first embodiment (FIG. 1), the device comprises:

a transmitter element 51 configured to emit a light beam 51a;

a receiving element 52 configured to receive a light beam 52a reflected by the radially inner ring 34. The light beam is reflected by the inner ring of the bearing which, depending on the application, may be integrated into the tubular body of the hub or may be, as in the example in the figures, an element separate from the hub 20 and mounted thereon;

an electronic component 53 for controlling and supporting the transmitter element 51 and the receiving element 52, preferably housed within the bearing unit and in particular on the axially inner edge 31a of the outer ring of the bearing, in a radially inner position relative to the edge;

a data cable 54 for transmitting optical readings to a controller which is of a known type and is therefore not shown. An end portion of the data cable 54 is electrically connected to the electronic component 53 and is housed in a groove 31b formed in the edge 31a of the outer ring.

Figure 2A:
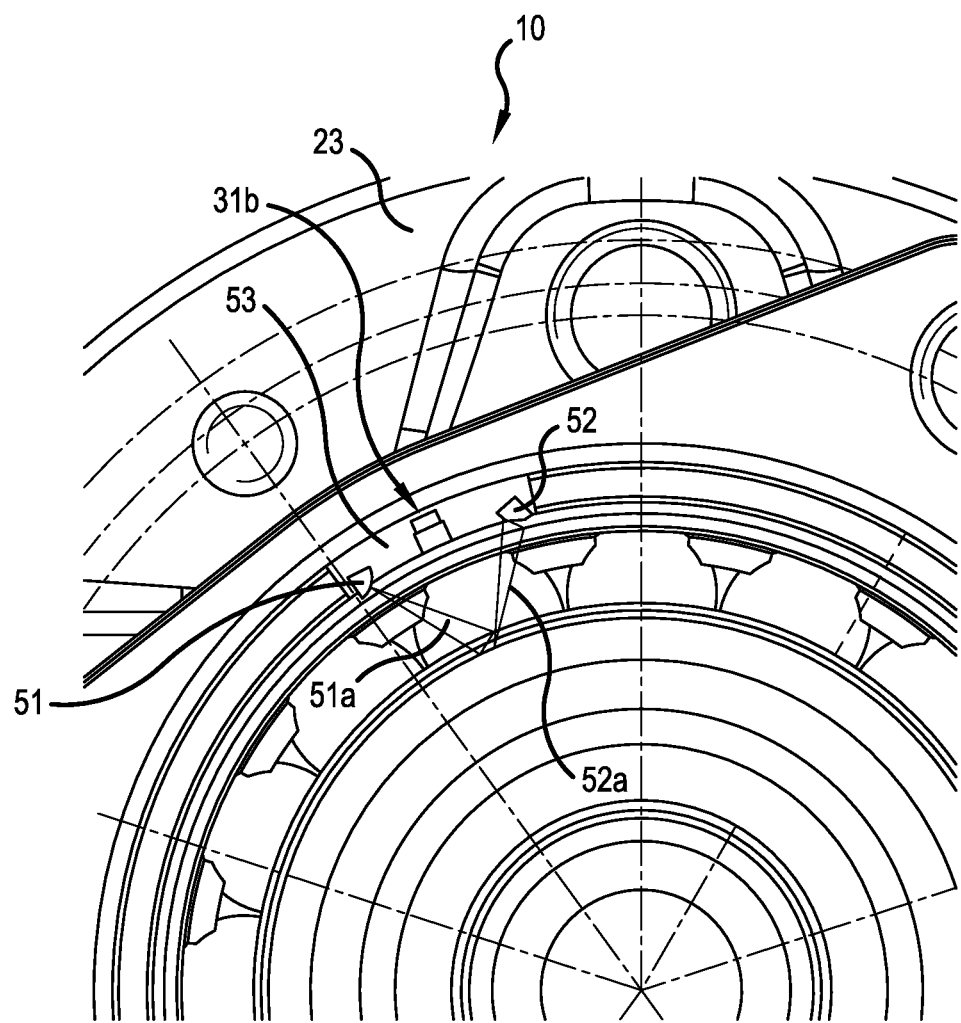
FIG. 2A presents a front view of a wheel hub bearing provided with a rotational speed measuring device using optical reading, in accordance with a second embodiment of the invention.
Figure 2B:
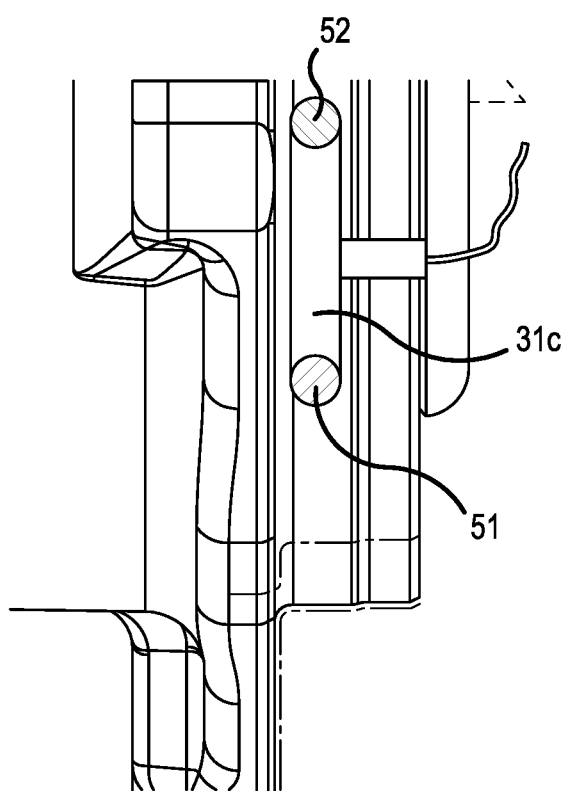
FIG. 2B presents a side view of the wheel hub bearing provided with the rotational speed measuring device using optical reading, as originally introduced in FIG. 2A.
Figure 2C:
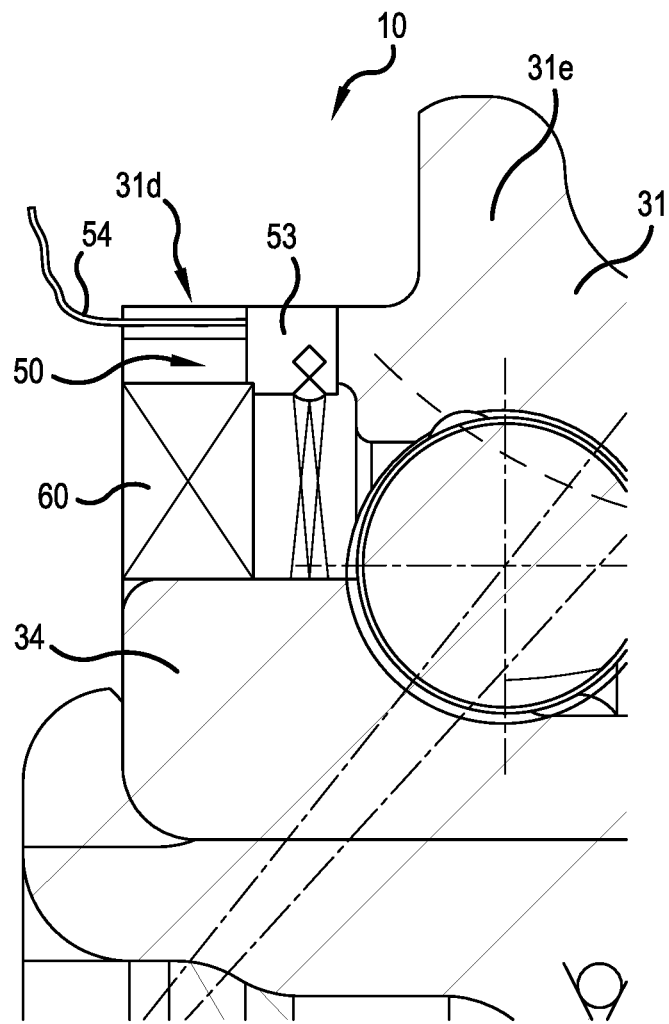
FIG. 2C presents a partial axisymmetric section view of the wheel hub bearing provided with the rotational speed measuring device using optical reading, as originally introduced in FIG. 2A.

With reference to FIGS. 2A, 2B and 2C, the different views and sections illustrate a variant of the mounting of the rotational speed measuring device. The wheel hub bearing 10 of FIGS. 2A, 2B and 2C has a configuration virtually identical to the bearing of FIGS. 1A and 1B, the only variation consisting in the provision of a seal 60 (shown only schematically in FIG. 2C), in an axially inner position between the outer ring 31 and the inner ring 34 of the bearing unit 30. Since the wheel hub bearing of FIGS. 2A, 2B and 2C is identical to the previous bearing except for the variant described above, the components of the bearing will not be described further. Additionally, some reference numerals are omitted from FIGS. 2A, 2B and 2C for simplicity, but may easily be ascertained from the previous figure.

According to this different embodiment (FIGS. 2A, 2B and 1C), the device 50 comprises:
- a transmitter element 51 configured to emit a light beam 51a;
- a receiving element 52 configured to receive a light beam 52a reflected by the radially inner ring 34;
- an electronic component 53 for controlling and supporting the transmitter element 51 and the receiving element 52, preferably housed within the bearing unit and in particular on the axially inner edge 31a of the outer ring of the bearing, in a first groove 31c formed in the edge 31a of the outer ring;
- a data cable 54 for transmitting optical readings to a controller which is of a known type and is therefore not shown. An end portion of the data cable 54 is electrically connected to the electronic component 53 and is housed in a second groove 31d formed in the edge 31a of the outer ring.

The figures described above show two variants of a preferred solution for the mounting of the optical reading rotational speed measuring device. Other forms of mounting are evidently possible, using the same principle. For example, the device could be mounted on the radially outer ring 31, and in particular on its radially outer flange 31e (shown in FIG. 2C), while the component used for reflecting the light beam could be the axially outer flange 23 of the hub 20, which evidently has the same rotational speed as the radially inner ring 34.

The measurement of the rotational speed by means of the device described above has a number of advantages over what can be achieved using known magnetic effect sensors. The preferred configuration described above incorporates the sensor in the bearing and reflects the light beam from the inner ring. Thus the problem of the distance between the sensor and the encoder is no longer present, because of this new technology, and the magnetic encoder is no longer necessary. Furthermore, this solution also overcomes the limitation related to the reading resolution, this limitation being due to the geometry of the encoder.

Therefore, by using such a device it is possible to improve considerably the resolution of the measurement of the rotational speed, compared with the resolution provided by the magnetic effect sensors commonly used for wheel hub bearings.

Furthermore, this solution reduces the geometrical constraints that must be complied with for the encoder solution, and does not require very strict machining tolerances. Finally, it requires a smaller number of components and reduces the amount of machining of the suspension, since there is no longer any need to house a magnetic effect revolution sensor in the suspension.

In addition to the embodiments of the invention as described above, it should be understood that there are numerous other variants. It should also be understood that the embodiments are solely provided by way of example and do not limit the object of the invention, or its applications, or its possible configurations. On the other hand, although the above description enables a person skilled in the art to implement the present invention at least according to an example of configuration thereof, it should be understood that it would be feasible to vary the components described in numerous ways without thereby departing from the object of the invention as defined in the attached claims, whether interpreted literally and/or according to their legal equivalents.

What is claimed is:

1. A wheel hub bearing for motor vehicles, comprising a rotatable hub and a bearing unit, the wheel hub bearing comprising:
   a radially outer stationary ring having at least one radially outer raceway and an axial inner end and an axial outer end;
   a radially inner rotatable ring having at least one radially inner raceway;
   a plurality of rolling bodies between the at least one inner raceway and the at least one outer raceway; and
   an optical reader for detecting a rotational speed of the rotatable hub or of the radially inner ring,
   wherein the optical reader includes a transmitter configured to emit a light beam and a receiver configured to receive a reflection of the light beam and a data cable for transmitting optical readings from the optical reader to a controller, and
   wherein the optical reader is mounted on an axially inner edge of a radially inner surface of the radially outer ring and located directly radially outward of the radially inner ring and axially between the axially inner end and the axially outer end of the outer ring.

2. The wheel hub bearing according to claim 1, wherein the transmitter is configured to emit the light beam radially inward toward the radially inner ring.

3. The wheel hub bearing according to claim 2, wherein the transmitter is configured to emit the light beam onto a radially outer surface of the radially inner ring.

4. The wheel hub bearing according to claim 1, wherein the transmitter is located directly radially inward of the radially outer ring.

5. The wheel hub bearing according to claim 1, wherein the optical reader does not extend radially outside the radially outer ring.

6. The wheel hub bearing according to claim 1,
   including a seal ring between the radially outer ring and the radially inner ring,
   wherein the transmitter is configured to emit the light beam against a location on the radially inner ring, the location being axially between the seal ring and the plurality of rolling bodies.

7. A wheel hub bearing for motor vehicles, comprising a rotatable hub and a bearing unit, the wheel hub bearing comprising:
   a radially outer stationary ring having at least one radially outer raceway;
   a radially inner rotatable ring having at least one radially inner raceway;
   a plurality of rolling bodies between the at least one inner raceway and the at least one outer raceway; and
   an optical reader for detecting a rotational speed of the rotatable hub or the radially inner ring,
   wherein the optical reader is mounted on the radially outer ring and further comprises:
   a transmitter configured to emit a light beam;
   a receiver configured to receive a light beam reflected from the radially inner ring;

an electronic component for management and support of the transmitter and the receiver, the electronic component being mounted on an axially inner edge of the radially outer ring; and a data cable having an end portion electrically connected to the electronic component for transmitting readings from the receiver to a controller, wherein the data cable is housed in a groove formed in the axially inner edge of the radially outer ring.

8. The wheel hub bearing according to claim 7, wherein the optical reader is housed in a first groove formed in the axially inner edge of the radially outer ring.

9. The wheel hub bearing according to claim 7, wherein the optical reader is mounted on a radially inner surface of the radially outer ring.

10. The wheel hub bearing according to claim 7, wherein the optical reader does not extend radially outside the bearing outer ring.

11. A wheel hub bearing for motor vehicles, comprising a rotatable hub and a bearing unit, the wheel hub bearing comprising:

a radially outer stationary ring having at least one radially outer raceway;

a radially inner rotatable ring having at least one radially inner raceway;

a plurality of rolling bodies between the at least one inner raceway and the at least one outer raceway; and an optical reader for detecting a rotational speed of the rotatable hub or the radially inner ring, wherein the optical reader is mounted on the radially outer ring and further comprises: a transmitter configured to emit a light beam and a receiver configured to receive a light beam reflected from the radially inner ring, the optical reader being mounted on an axially inner edge of the radially outer ring; and a data cable having an end portion electrically connected to the optical reader for transmitting readings from the receiver to a controller, wherein the optical reader is housed in a first groove formed in the axially inner edge of the radially outer ring, and wherein the data cable is housed in a second groove formed in the axially inner edge of the radially outer ring.

12. The wheel hub bearing assembly according to claim 11, wherein the optical reader is mounted on a radially inner surface of the radially outer ring.

13. The wheel hub bearing according to claim 11, wherein the optical reader does not extend radially outside the bearing outer ring.

* * * * *